Figure 1:
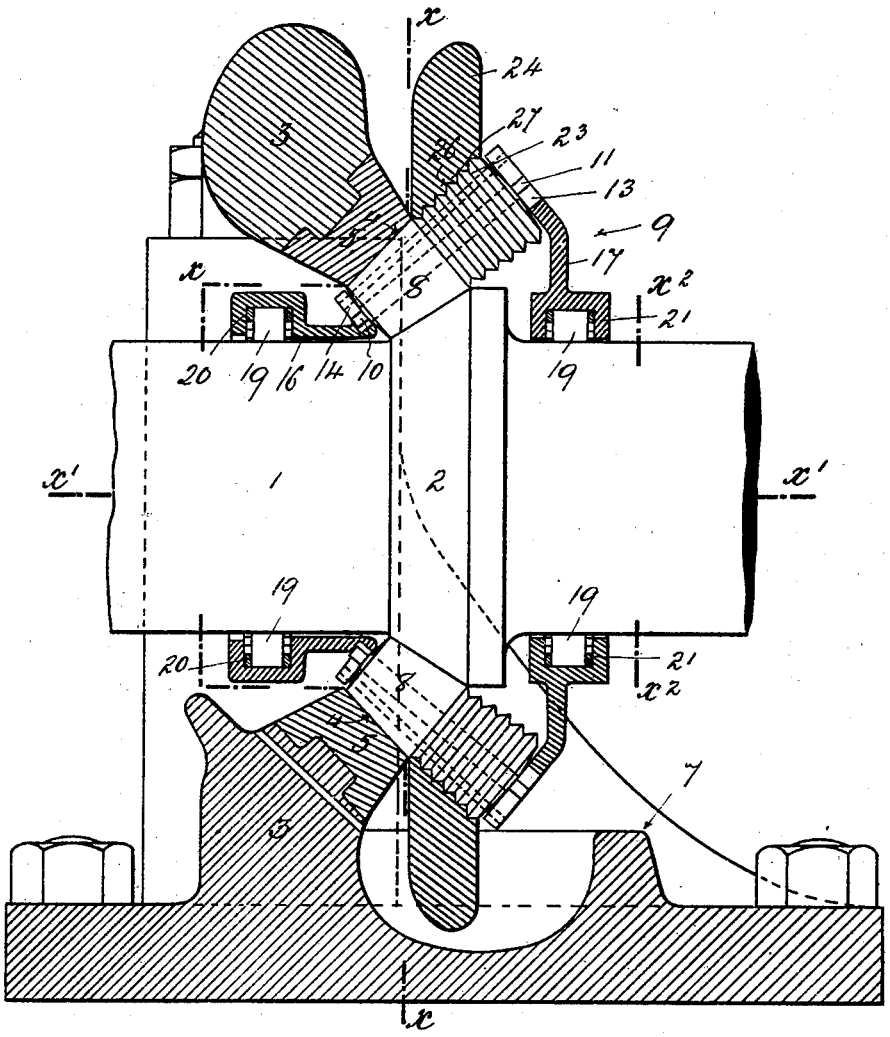

No. 673,264. Patented Apr. 30, 1901.
J. HOLT.
THRUST BEARING.
(Application filed Jan. 2, 1901.)

(No Model.) 5 Sheets—Sheet 1.

WITNESSES INVENTOR John Holt
BY James L. Norris
ATTY

No. 673,264. Patented Apr. 30, 1901.
J. HOLT.
THRUST BEARING.
(Application filed Jan. 2, 1901.)
(No Model.) 5 Sheets—Sheet 3.

No. 673,264. Patented Apr. 30, 1901.
J. HOLT.
THRUST BEARING.
(Application filed Jan. 2, 1901.)
(No Model.) 5 Sheets—Sheet 4.

WITNESSES
INVENTOR
John Holt
BY James L. Norris
ATTY

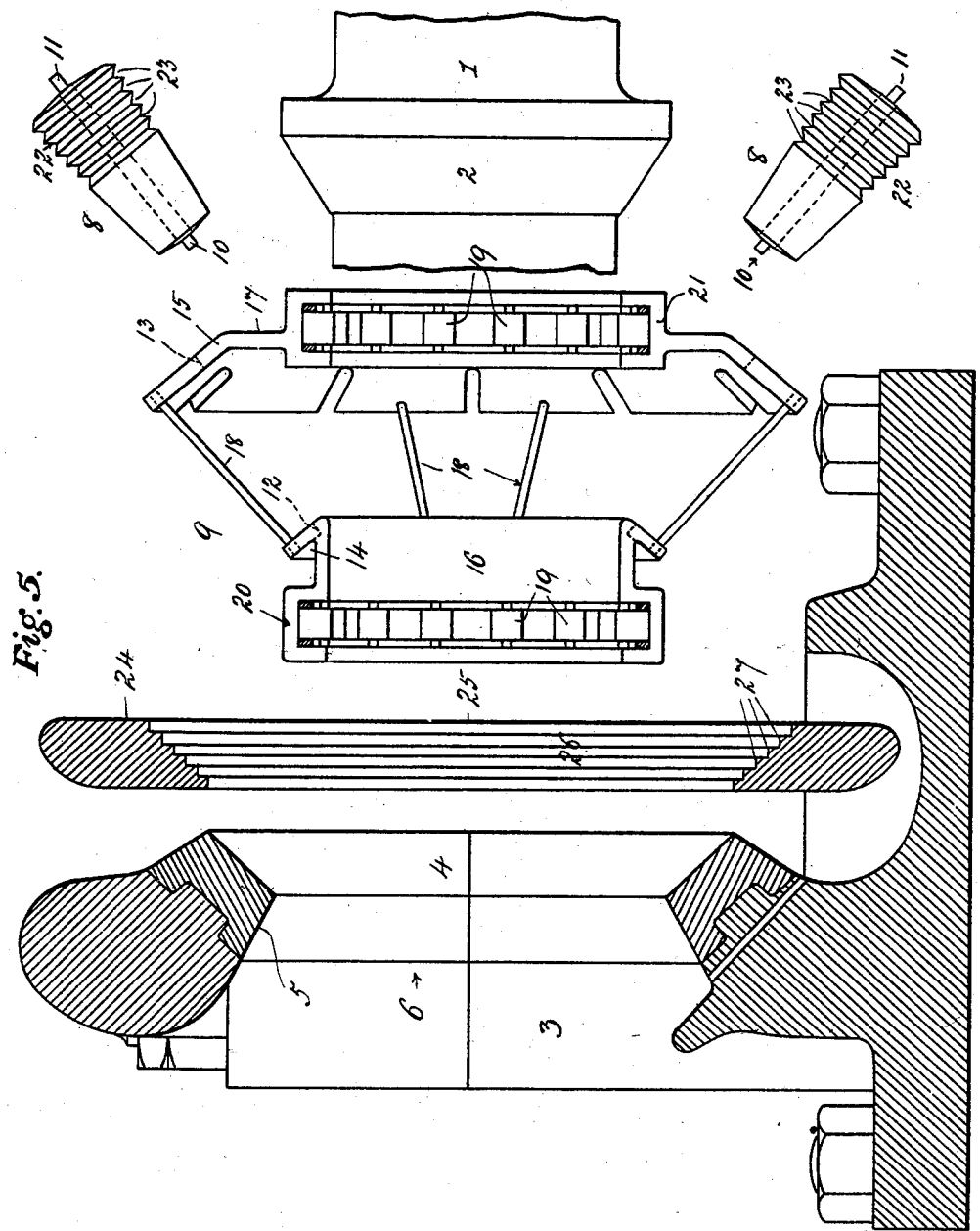

UNITED STATES PATENT OFFICE.

JOHN HOLT, OF ASTON, NEAR BIRMINGHAM, ENGLAND.

THRUST-BEARING.

SPECIFICATION forming part of Letters Patent No. 673,264, dated April 30, 1901.

Application filed January 2, 1901. Serial No. 41,843. (No model.)

*To all whom it may concern:*

Be it known that I, JOHN HOLT, engineer, a subject of the Queen of Great Britain, residing at Frederick road, Aston, near the city of Birmingham, England, have invented certain new and useful Improvements in Thrust-Bearings, of which the following is a specification.

This invention relates to thrust-bearings for use in connection with propeller-shafts and other shafts for transmitting an endwise or longitudinal pressure; and, specifically, my said invention refers to thrust-bearings for propeller-shafts of that type in which a series of conical antifriction-rollers are arranged around a conical collar on the shaft and between the said collar and a coned thrust-surface of a fixed block which receives the said longitudinal pressure and transmits it to the body of the vessel to be propelled. In such constructions the longitudinal pressure upon the interposed rollers tends to force them away from their coned or inclined bearing-surfaces, and to prevent this keeper-rings are employed to engage the rollers and retain them in proper working contact with the coned bearing-surfaces upon which they respectively roll; but it has been found that the friction developed between the rollers and their bearings in the retaining-rings is so great as to materially neutralize the advantages obtained by the use of such interposed rollers.

The objects of the present improvements are to so arrange and construct the interposed rollers and their pressure-sustaining keeper-rings that the rollers are kept in their proper working positions, while the pressure exerted upon them relative to the pressure transmitting and receiving surfaces of the shaft and thrust-block, respectively, is conveyed to the ring by their free rolling contact therewith, thus reducing friction between the said rollers and their working surfaces very considerably, and consequently preventing the loss of a large amount of power. This I propose to effect by the employment, in connection with the series of conical bearing-rollers, of a pressure-sustaining keeper-ring which is so formed and mounted as to confine the said rollers and prevent their being spread or separated by the action of the thrust-pressure and the coned bearing-surfaces, while it is also capable of a free and independent rotation relative to the said rollers. The rollers work upon the inner periphery of their keeper and pressure receiving and sustaining ring, which receives that portion of the thrust-pressure which reacts upon the rollers and tends to force them rearward out of their working positions, and as the ring is free to rotate and is driven around by the friction of the rollers the said pressure upon the rollers is conveyed to the ring in the direction of the rotation of the latter, whereby the rollers themselves are relieved of considerable friction and left free to roll, although they are kept under perfect control in their proper working positions.

Figure 2:
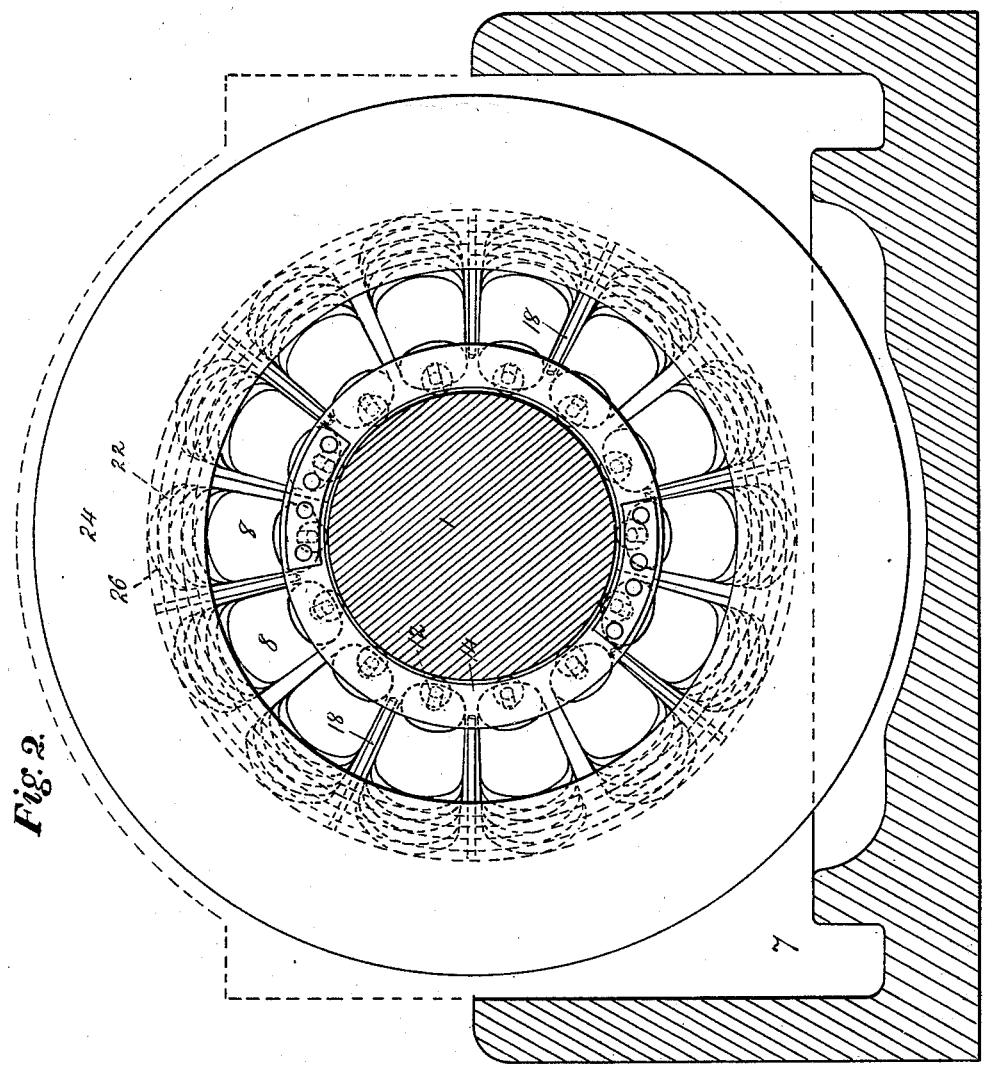
Figure 3:
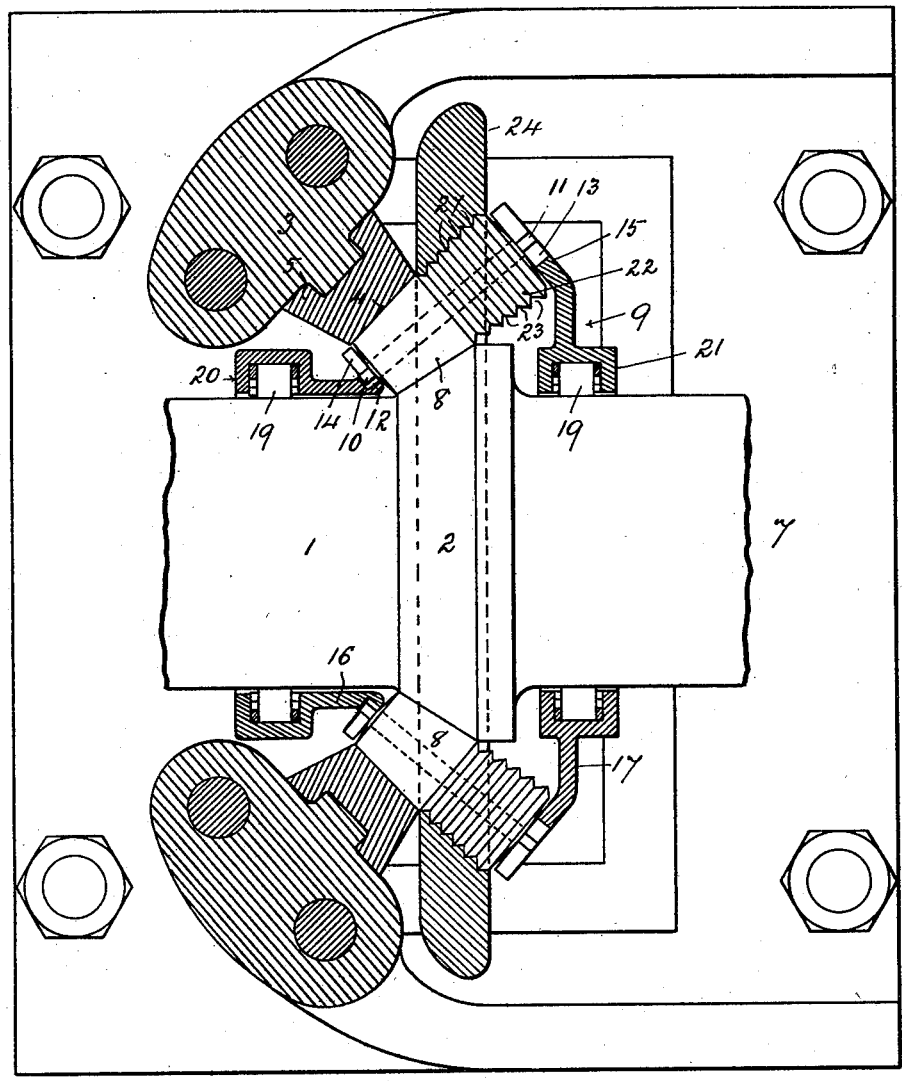
Figure 4:
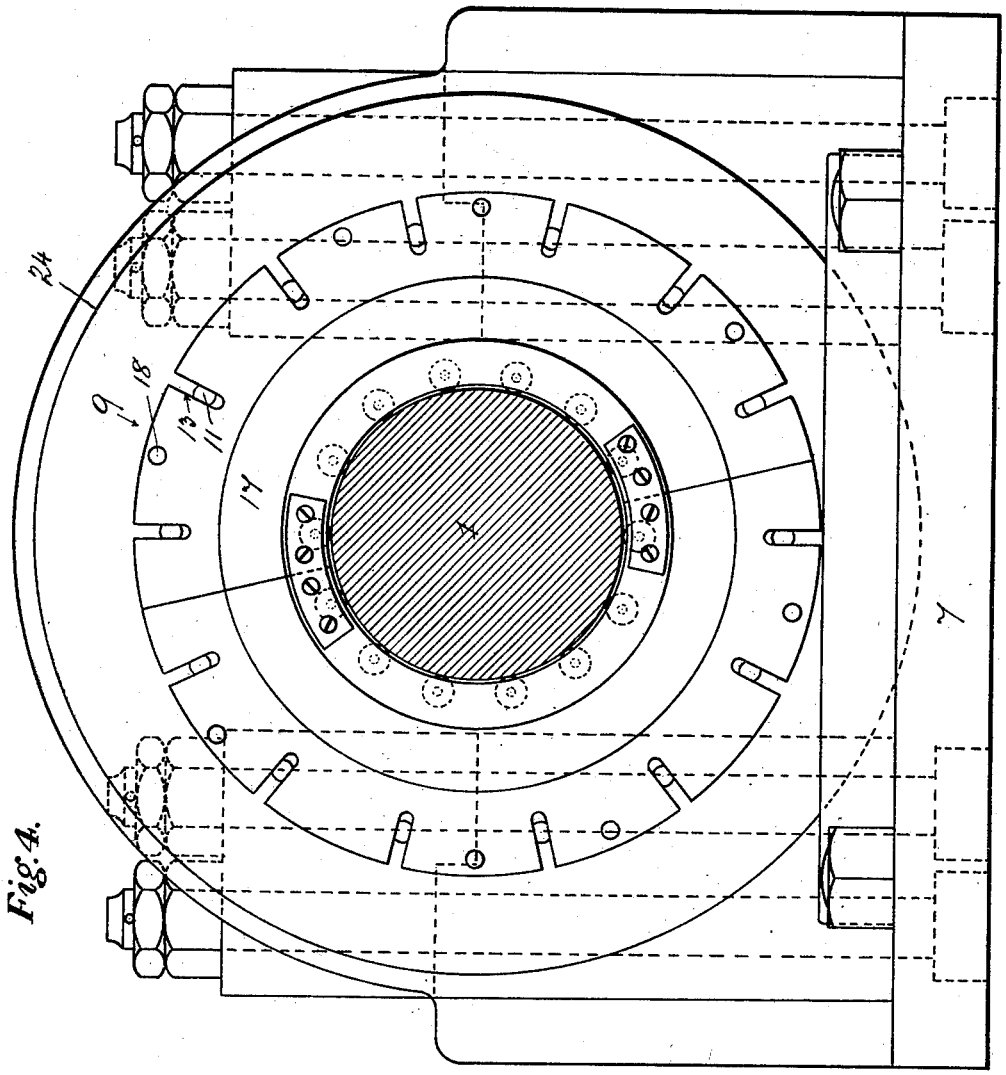

Figure 1 of the accompanying drawings represents a longitudinal vertical section (with the shaft in elevation) of a single-block thrust-bearing for a propeller-shaft constructed and arranged in accordance with one form of my invention. Fig. 2 is a transverse vertical section of the said thrust-bearing upon the dotted line $x$, Fig. 1. Fig. 3 represents a horizontal section of the bearing upon the dotted line $x'$, Fig. 1, while Fig. 4 is another transverse vertical section of Fig. 1, but taken upon the dotted line $x^2$ looking toward the back of the roller-retaining ring. Fig. 5 shows various elements of the bearing separated from one another, partly in longitudinal section and partly in elevation.

The same numerals of reference indicate corresponding parts in the several figures of the drawings.

The thrust-shaft 1, through which the thrust of the screw is transmitted, is provided with a male-coned collar 2, while the thrust-block 3, which is bolted to the body of the vessel, as usual, and receives the pressure transmitted through the shaft has a female-coned bearing surface 4, preferably formed by a ring of hard steel 5, suitably secured to the said thrust-block, which has a central opening 6, through which the shaft is directed, and a base plate or foot 7 of suitable form. Located between the opposed male and female coned thrust-surfaces of the shaft and the block is an annular series of conical antifriction-rollers 8, supported and confined in a cage 9, mounted upon and being free to revolve around the shaft. These interposed rollers are so disposed around the collar 2 that their axes converge toward a common point in the axis of the shaft itself and are provided with central fixed spindles upon which the said rollers rotate, while their opposite ends 10 and 11 are held in slots 12 13, formed, respectively, in the flanges 14 15 of the roller-cage 9, which is made in two parts 16 17, connected together by removable pins 18 or other suitable means, with the one part 16 coming behind the thrust-block and the other part 17 being disposed in front of it and with each part having a series of antifriction-rollers 19, disposed in annular races 20 21, for the purpose of minimizing friction between the cage and the shaft in the event of these parts rotating at different speeds.

The rearward or diverging ends 22 of the conical rollers 8 are formed with a series of annular grooves or channels 23, while surrounding all of the said rollers is a loose, free, or independent keeper and pressure receiving and sustaining ring 24, the central aperture 25 of which is coned to correspond to the converging taper of the rollers, while the inner periphery 26 is provided with a series of annular V-sectioned ribs or steps 27, successively decreasing in diameter from the rearmost one, which is the largest, to the foremost and corresponding in number and sectional shape to the channels or grooves 23, formed around the rearward ends of the rollers, and with which the said ribs or steps engage, so that the rollers and the ring have stepped bearing-surfaces engaging one with the other. By means of this loosely-mounted keeper and pressure-sustaining ring, with the engaging bearing-surfaces, as described, the rollers are retained in proper working contact with the male and female coned surfaces upon which they respectively roll, and when a longitudinal thrust is being conveyed from the rotating thrust-shaft, through the medium of the rollers, to the fixed thrust-block the rollers rotate upon their own axes and also revolve with their cage bodily around the shaft, while the tendency of the thrust-pressure to spread the rollers by forcing them rearwardly over the coned collar of the shaft and from between their working surfaces is neutralized by the confining keeper-ring, which is rotated around the ends of the rollers by the frictional contact between the engaging peripheries, and the pressure exerted upon the rollers is conveyed by them to the frictionally-rotated keeper and pressure-sustaining ring in the direction of its rotation, thus materially reducing friction, as aforesaid.

The bearing is adjusted and wear taken up by arranging the thrust-block to have a longitudinal sliding motion relative to the shaft. This adjustment of the thrust-block may be secured by some convenient means common in this art.

Having fully described my invention, what I desire to claim and secure by Letters Patent is—

1. In a thrust-bearing, bearing members having coned thrust transmitting and receiving surfaces, rollers interposed between said surfaces, and a keeper and pressure receiving and sustaining ring freely rotative around and engaging said rollers, the engaging faces of the rollers and ring being conical.

2. In a thrust-bearing, bearing members having coned thrust transmitting and receiving surfaces, rollers interposed between said surfaces, and a keeper and pressure receiving and sustaining ring freely rotative around and engaging said rollers, the engaging faces of the rollers and ring being conical and stepped.

3. In a thrust-bearing a shaft and a block provided with coned surfaces, rollers adapted to travel upon said surfaces, and a freely-rotative pressure receiving and sustaining keeper device surrounding and bearing against the rollers, the engaging faces of said member and rollers being conical.

4. In a thrust-bearing, a two-part cage, rollers rotatively supported by the respective parts of the cage, and a freely-rotative ring surrounding and engaging the rollers, the engaging portions of the ring and rollers being conical and the working portions of the rollers being also conical.

5. In a thrust-bearing a block, and a shaft extending through said block, said parts having coned surfaces, a two-part cage, the respective parts having raceways, rollers fitted in said raceways to travel against the shaft, rollers supported for rotation by the respective parts of the cage, and a freely-rotative ring surrounding and engaging the rollers, the engaging surfaces of the ring and rollers being conical.

In testimony whereof I have hereunto set my hand in presence of two subscribing witnesses.

JOHN HOLT.

Witnesses:
ARTHUR T. SADLER,
GAVIN RALSTON.